(12) United States Patent
Fukui et al.

(10) Patent No.: US 8,198,855 B2
(45) Date of Patent: Jun. 12, 2012

(54) CHARGING CABLE, CHARGING CONTROL DEVICE AND VEHICLE CHARGING SYSTEM

(75) Inventors: Satoshi Fukui, Kobe (JP); Kenichi Ishii, Nishikamo-gun (JP); Ryuichi Kamaga, Nissin (JP); Masahiro Karami, Obu (JP)

(73) Assignees: Fujitsu Ten Limited, Kobe (JP); Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 443 days.

(21) Appl. No.: 12/498,094

(22) Filed: Jul. 6, 2009

(65) Prior Publication Data
US 2010/0007306 A1  Jan. 14, 2010

(30) Foreign Application Priority Data

Jul. 14, 2008 (JP) ................. 2008-182135

(51) Int. Cl.
*H02J 7/14* (2006.01)
*H02J 7/00* (2006.01)
*B60K 6/20* (2007.10)
*B60W 10/30* (2006.01)

(52) U.S. Cl. ........ 320/104; 320/128; 320/132; 320/134; 320/136; 320/137; 903/903; 903/907; 180/65.21; 180/65.27; 180/65.275

(58) Field of Classification Search .................... 320/104
See application file for complete search history.

(56) References Cited

U.S. PATENT DOCUMENTS 5,369,352 A * 11/1994 Toepfer et al. ................. 320/110
5,629,606 A *  5/1997 Asada ............................. 322/28
5,820,395 A    10/1998 Hashizawa

FOREIGN PATENT DOCUMENTS

JP         A-09-161882        6/1997

OTHER PUBLICATIONS

SAE International Agenda, PHEV Charge Coupler & Cord Set Practice, 2007, Host-Gery Kissel, SAE Automotive Headquarters—Troy, Michigan.
"Ace Charging System," Advanced Conductive EV Charging System, 2006, Tesla Motors Inc., pp. 1-24.
"Electric vehicle conductive charging system: General requirements," *Japan Electric Vehicle Association Standard*, 2001, pp. 1-29. (with partial translation).

\* cited by examiner

*Primary Examiner* — Edward Tso
*Assistant Examiner* — Ahmed Omar
(74) *Attorney, Agent, or Firm* — Oliff & Berridge, PLC

(57) ABSTRACT

Provided is a charging cable capable of detecting an abnormal state, such as a break, of a control line through which a pilot signal is transmitted, the charging cable including: a power cable through which an external power source feeds a power storage device; a signal generating circuit for generating a control signal to output to a vehicle; a control line L1 through which the control signal is transmitted to the vehicle; and a bypass circuit for changing a voltage applied from a vehicle side through the control line L1.

5 Claims, 12 Drawing Sheets

CHARGING CABLE, CHARGING CONTROL DEVICE AND VEHICLE CHARGING SYSTEM

This application is based on an application No. 2008-182135 filed in Japan, the contents of which are hereby incorporated by reference.

BACKGROUND OF THE INVENTION

1. Field of the Invention

The present invention relates to a charging cable, a charging control device, and a vehicle charging system for charging a vehicle-driving power storage device provided in a vehicle.

2. Description of the Related Art

Attention has been given in recent years to environment-conscious vehicles such as electric vehicles, hybrid vehicles, and fuel cell vehicles. These vehicles are equipped with electric motors for generating power to drive the vehicles and power storage devices for storing power supplied to the electric motors. Hybrid vehicles are further equipped with internal combustion engines as power sources in addition to the electric motors, while fuel cell vehicles are equipped with fuel cells as vehicle-driving DC power sources.

Some of the foregoing vehicles are known to be able to charge the vehicle-driving power storage devices by domestic power sources. For example, power is supplied from the domestic power source to the power storage device through a charging cable connected between a receptacle of commercial power source in a residential house and a charging port of the vehicle. Those vehicles capable of charging the on-board power storage devices by external power sources are referred to as "plug-in vehicles."

Japanese Unexamined Patent Publication No. 1997-161882 discloses a structure of a charging connector of an electric automobile.

Standards for the plug-in vehicles are established in the United States by "SAE Electric Vehicle Conductive Charge Coupler" (November 2001) according to SAE International standards, and in Japan by "General Requirements for Electric Vehicle Conductive Charging System (Mar. 29, 2001)" in Japan Electric Vehicle Association Standard (Japan Electric Vehicle Standard).

"SAE Electric Vehicle Conductive Charge Coupler" and "General Requirements for Electric Vehicle Conductive Charging System" define standards regarding, for example, control pilot.

The control pilot is defined as a control line connecting a control circuit for EVSE (Electric Vehicle Supply Equipment), which supplies power from a premises wiring to the vehicle, and a ground portion of the vehicle through a vehicle-side control circuit. A pilot signal transmitted through the control line is used as a basis for, for example, detecting the state of connection of the charging cable, determining whether power can be supplied from the power source to the vehicle, and detecting the rated current of the EVSE.

However, "SAE Electric Vehicle Conductive Charge Coupler" and "General Requirements for Electric Vehicle Conductive Charging System" do not particularly define details of how to detect a break of the control line through which the pilot signal is transmitted.

For example, when the potential of the control line is at ground level, this cannot be differentiated between a break of the control line, failure of the power source, unintentional disconnection of the charging cable off the receptacle, and other causes.

Thus, when the charging cable is connected but the power storage device is not charged, the user is not aware of this situation until the power storage device is in a discharged state. This forces the hybrid vehicles to run only on fuel such as gasoline to the detriment of mileage.

The pilot signal is a requisite signal for controlling charging of plug-in vehicles. It is therefore vital to detect abnormality in the pilot signal, especially a break of the control line through which the pilot signal is transmitted.

SUMMARY OF THE INVENTION

It is an object of the present invention to provide a charging cable, a charging control device, and a vehicle charging system that are capable of detecting abnormality of the charging cable including a break of the control line through which the pilot signal is transmitted.

In order to accomplish the above object, a charging cable according to the present invention is characterized in including: a power cable through which an external power source feeds a power storage device located in a vehicle; a signal generating circuit for generating a control signal corresponding to a capacity of current feedable to the vehicle through the power cable; a control line through which the control signal is transmitted to the vehicle; a feeding control portion for controlling the feeding through the power cable on the basis of a voltage level of the control line; and a bypass circuit for changing voltage applied from a vehicle side through the control line.

A charging control device according to the present invention is characterized in including: a charging control portion for charging the power storage device on the basis of the control signal transmitted through the control line; and a state detecting portion for detecting an abnormal state of the charging cable on the basis of a signal level of the control line.

A vehicle charging system according to the present invention is characterized in including a charging control device having the above-described characterized configuration and for carrying out charging control of a power storage device located in a vehicle through a charging cable having the above-described characterized configuration.

The present invention will become more apparent in the detailed description of the preferred embodiments presented below.

DESCRIPTION OF THE PREFERRED EMBODIMENTS

Embodiments of a plug-in hybrid vehicle to which a charging cable, a charging control device, and a vehicle charging system according to the present invention are applied will be described.

Figure 1:
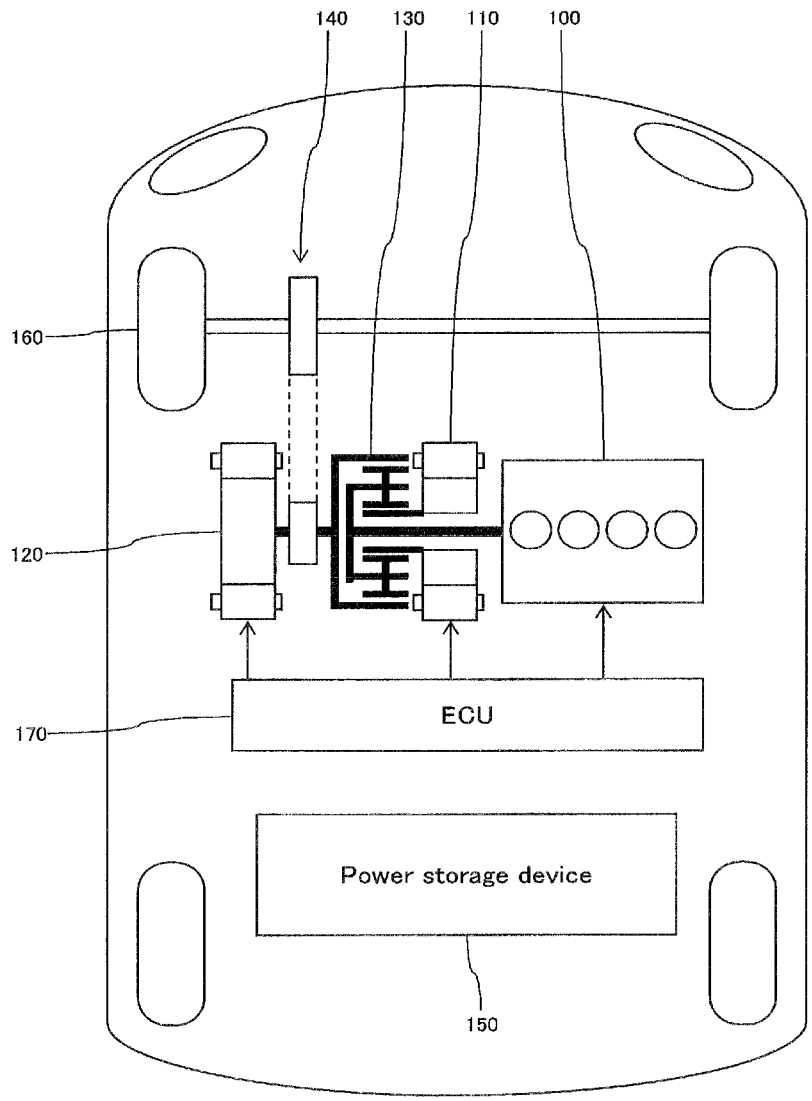
FIG. 1 is a configuration block diagram for illustrating a plug-in hybrid vehicle taken as an example of a vehicle to which a system activating device according to an embodiment of the present invention is applied.

Referring to FIG. 1, a plug-in hybrid vehicle includes an engine 100, a first MG (motor generator) 110, a second MG 120, a power dividing mechanism 130, a decelerator 140, a power storage device 150, driving wheels 160, and an electronic control device 170 (hereinafter occasionally referred to as an ECU 170) acting as the charging control device of the present invention.

The plug-in hybrid vehicle has its engine 100, first MG 110, and second MG 120 coupled to the power dividing mechanism 130 in order to be able to run on driving power from at least either the engine 100 or the second MG 120.

The power generated at the engine 100 is divided by the power dividing mechanism 130 into two pathways, namely, a pathway through which the power is transmitted to the driving wheels 160 through the decelerator 140 and a pathway through which the power is transmitted to the first MG 110.

The first MG 110 is an AC rotating machine, examples including a three-phase AC synchronous motor with a U-phase coil, a V-phase coil, and a W-phase coil. The first MG 110 is driven to generate power by the power of the engine 100 divided at the power dividing mechanism 130.

For example, when the state of charge (hereinafter occasionally referred to as SOC) of the power storage device 150 drops below a predetermined value, the engine 100 is activated to cause the first MG 110 to generate power. The power generated by the first MG 110 is converted from AC to DC through an inverter, passed through a converter for voltage adjustment, and then stored in the power storage device 150.

The second MG 120 is an AC rotating machine, examples including a three-phase AC synchronous motor with a U-phase coil, a V-phase coil, and a W-phase coil. The second MG 120 generates driving power by using at least either the power stored in the power storage device 150 or the power generated by the first MG 110. The driving power is transmitted to the driving wheels 160 through the decelerator 140.

The second MG 120 assists the engine 100 and causes the vehicle to run on the driving power from the second MG 120. While in FIG. 1 the driving wheels 160 are front wheels, the rear wheels may be driven by the second MG 120 instead of or together with the front wheels.

At the time of braking or like situations, the second MG 120 is driven by the driving wheels 160 through the decelerator 140 in order to operate as a power generator. That is, the second MG 120 acts as a regenerative brake for converting the braking energy into electrical power. Then the power generated by the second MG 120 is stored in the power storage device 150.

The power dividing mechanism 130 is composed of a planetary gear including a sun gear, a pinion gear, a carrier, and a ring gear. The pinion gear is engaged with the sun gear and the ring gear, and the carrier rotatably supports the pinion gear and is coupled to a crank shaft of the engine 100. The sun gear is coupled to a rotational shaft of the first MG 110, and the ring gear is coupled to a rotational shaft of the second MG 120 and to the decelerator 140.

Figure 2:
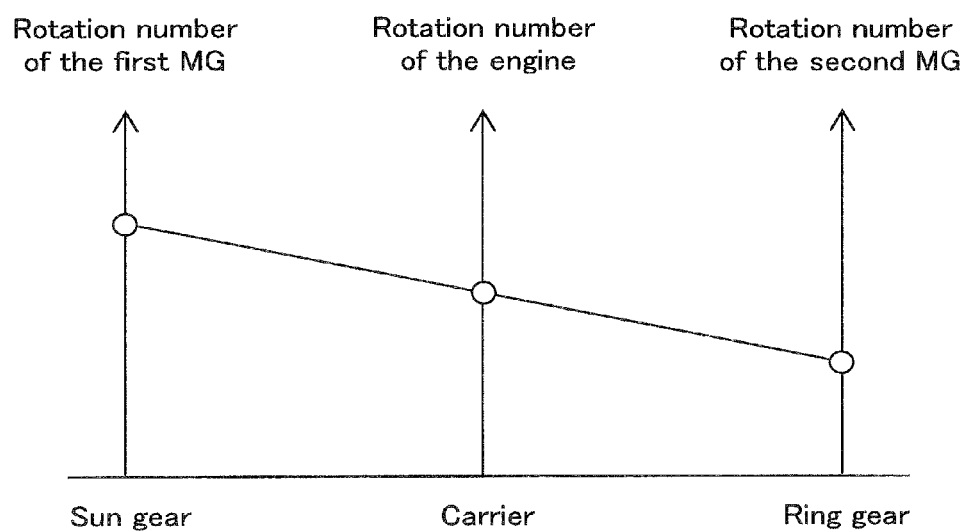
FIG. 2 is an alignment chart for a power dividing mechanism.

The engine 100, the first MG 110, and the second MG 120 are coupled to each other through the power dividing mechanism 130, which is composed of a planetary gear, so that the rotation numbers of the engine 100, the first MG 110, and the second MG 120 result in the relation shown on the alignment chart in FIG. 2, in which the rotations are connected to each other by a linear line.

Referring to FIG. 1, the power storage device 150 is a chargeable-dischargeable DC power source and composed of, for example, a secondary battery such as of nickel hydrogen and lithium ion. The voltage of the power storage device 150 is approximately 200 V; for example. As well as the power generated by the first MG 110 and the second MG 120, the power storage device 150 stores power supplied from power sources outside the vehicle, as described later.

As the power storage device 150, it is also possible to employ a capacitor of large capacitance or any power buffers that can temporarily store the power generated by the first MG 110 and the second MG 120 and the power from power sources outside the vehicle and supply the stored power to the second MG 120.

The engine 100, the first MG 110, and the second MG 120 are controlled by the ECU 170. The ECU 170 may have a divided configuration to correspond to each of the functions.

Figure 3:
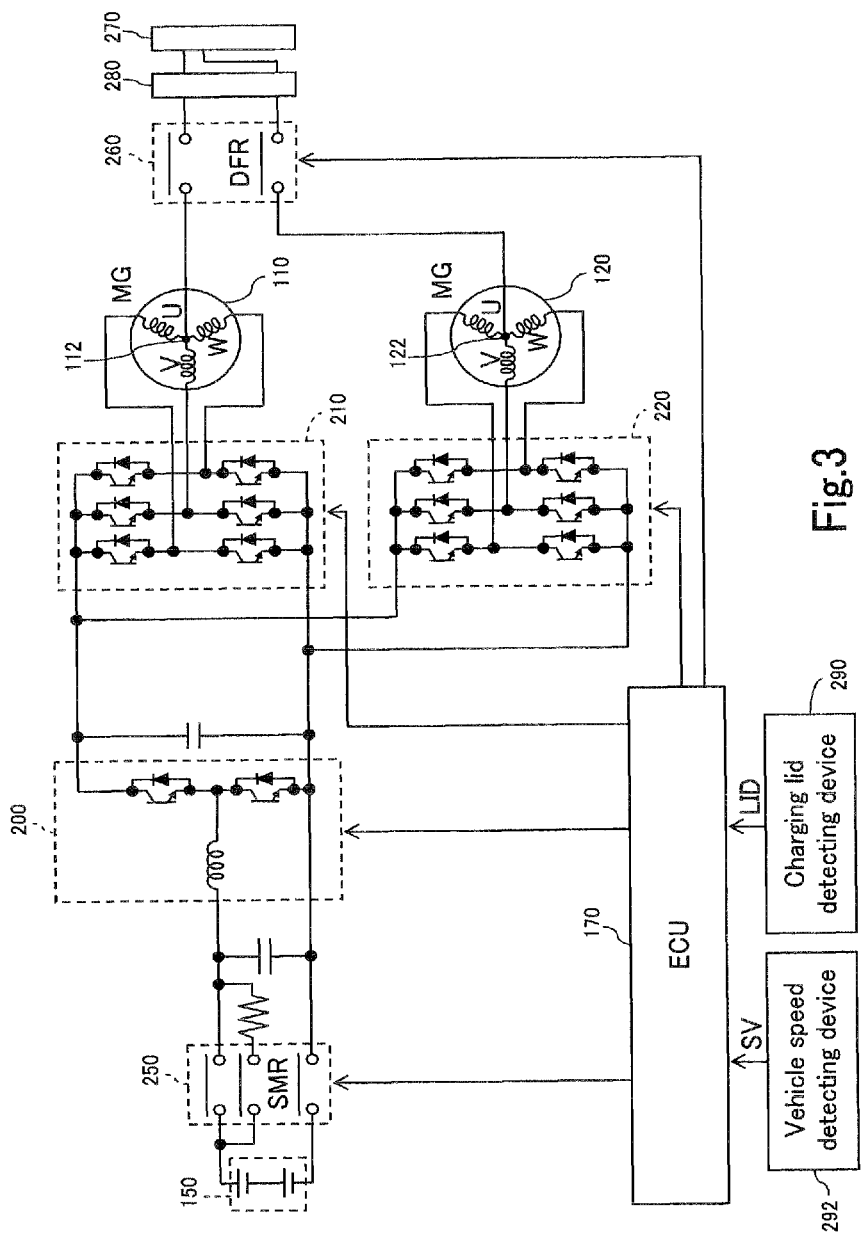
FIG. 3 is a schematic configuration diagram for illustrating an electric system of the plug-in hybrid vehicle shown in FIG. 1.

FIG. 3 is a schematic configuration diagram for illustrating an electric system of the plug-in hybrid vehicle shown in FIG. 1. Referring to FIG. 3, this electric system includes the power storage device 150, an SAM (System Main Relay) 250, a converter 200, a first inverter 210, a second inverter 220, the first MG 110, the second MG 120, a DFR (Dead Front Relay) 260, an LC filter 280, a charging inlet 270, a charging lid detecting device 290, and a vehicle speed detecting device 292.

The SMR 250 is located between the power storage device 150 and the converter 200. The SMR 250 is a relay for making/breaking a connection between the power storage device 150 and the electric system and is on/off controlled by the ECU 170.

That is, the SMR 250 is turned on to electrically connect the power storage device 150 to the electric system when the vehicle is running and the power storage device 150 is charged by a power source outside the vehicle. When the vehicle system stops, the SMR 250 is turned off to electrically disconnect the power storage device 150 from the electric system.

The converter 200 includes a reactor, two npn transistors, and two diodes. The reactor is connected at one end to the positive electrode side of the power storage device 150 and connected at the other end to the node of the two npn transistors. The two npn transistors are connected to one another in series and the diodes are connected to the npn transistors in antiparallel.

As the npn transistors, IGBTs (insulated gate bipolar transistors) may be used, for example. Instead of the npn transistors, power switching elements may be used such as power MOSFETs (Metal Oxide Semiconductor Field-Effect Transistors).

When power is supplied from the power storage device 150 to the first MG 110 or the second MG 120, the converter 200 boosts the voltage of the power discharged from the power storage device 150 on the basis of a control signal from the ECU 170 and supplies the boosted power to the first MG 110 or the second MG 120. When the power storage device 150 is charged, the converter 200 reduces the voltage of the power supplied from the first MG 110 or the second MG 120 and outputs the reduced power to the power storage device 150.

The first inverter 210 includes a U-phased arm, a V-phased arm, and a W-phased arm. The U-phased arm, the V-phased arm, and the W-phased arm are connected to each other in parallel. Each phased arm includes two npn transistors connected to one another in series and two diodes connected to the npn transistors in antiparallel. The node of the two npn transistors of each phased arm is connected to a corresponding coil end, other than a neutral point 112, of the first MG 110.

The first inverter 210 converts DC power supplied from the converter 200 into AC power and supplies the converted power to the first MG 110. The first inverter 210 converts AC power generated by the first MG 110 into DC power and supplies the converted power to the converter 200.

The second inverter 220 is configured similarly to the first inverter 210. The connection point of the two npn transistors of each phased arm is connected to a corresponding coil end, other than a neutral point 122, of the second MG 120.

The second inverter 220 converts DC power supplied from the converter 200 into AC power and supplies the converted power to the second MG 120. The second inverter 220 converts AC power generated by the second MG 120 into DC power and supplies the converted power to the converter 200.

When the power storage device 150 is charged by a power source located outside the vehicle, the first inverter 210 and the second inverter 220 convert, by a method described later, AC power fed to the neutral point 112 of the first MG 110 and the neutral point 122 of the second MG 120 from the external power source into DC power on the basis of a control signal from the ECU 170, and supply the converted DC power to the converter 200.

The DFR 260 is located between a pair of power lines connected to the neutral points 112 and 122 and a pair of power lines connected to the LC filter 280. The DFR 260 is a relay for making/breaking an electrical connection between the charging inlet 270 and the electric system and is on/off controlled by the ECU 170.

That is, the DFR 260 is turned off to electrically disconnect the charging inlet 270 from the electric system while the vehicle is running. When the power storage device 150 is charged by the external power source, the DFR 260 is turned on to electrically connect the charging inlet 270 to the electric system.

The LC filter 280 is located between the DFR 260 and the charging inlet 270 in order to prevent, when the power storage device 150 is charged by the external power source, output of a high frequency noise from the electric system of the plug-in hybrid vehicle to the external power source.

The charging inlet 270 is an electric interface for receiving charging power from the external power source. When the power storage device 150 is charged by the external power source, the charging inlet 270 is connected with a connector of a charging cable through which the power is supplied to the vehicle from the external power source.

The ECU 170 generates control signals for driving the SMR 250, the converter 200, the first inverter 210, the second inverter 220, and the DFR 260 in order to control the behavior of these devices. In this manner the ECU 170 carries out charging control of the power storage device 150, which is located in the vehicle, through the charging cable.

The charging lid detecting device 290 detects an open/closed state of a lid (charging lid) of an opening in which the charging inlet 270 is stored, and outputs a lid signal LID indicative of the open/closed state to the ECU 170. The vehicle speed detecting device 292 detects a vehicle speed SV of this plug-in hybrid vehicle and outputs the detection value to the ECU 170.

Figure 4:
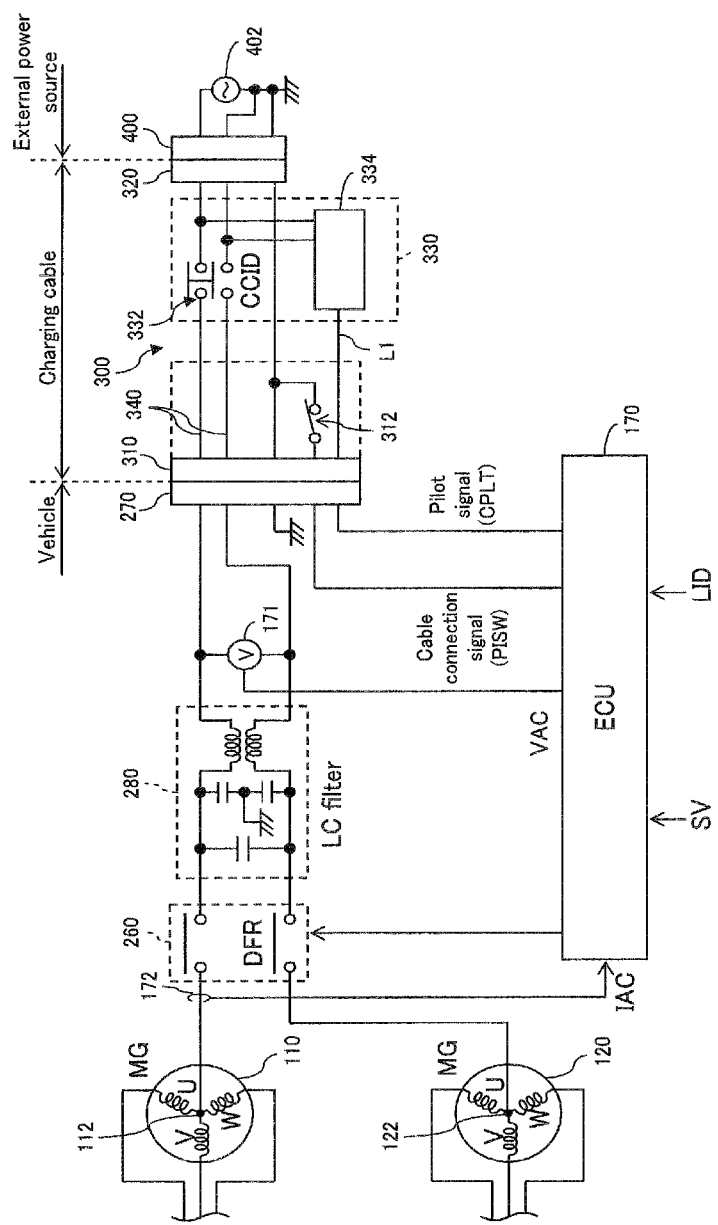
FIG. 4 is a configuration block diagram for illustrating a charging mechanism connected to the electric system shown in FIG. 3.

FIG. 4 is a configuration block diagram for illustrating a charging mechanism connected to the electric system shown in FIG. 3. Referring to FIG. 4, the charging cable 300 that couples the plug-in hybrid vehicle to a power source located outside the vehicle includes a pair of power cables 340 through which the external power source 402 feeds the power storage device 150, a connector 310, a plug 320, and a CCID (charging circuit interrupt device) 330.

The connector 310 is connected to the charging inlet 270 located in the vehicle. The connector 310 has a limit switch 312 located thereon. Upon connection of the connector 310 to the charging inlet 270, a cable connection signal PISW, which is a contact signal of the limit switch 312, is input to the ECU 170, and thus the ECU 170 detects that the connector 310 is connected to the charging inlet 270.

The plug 320 is connected to, for example, a power source receptacle 400 located in a residential house. The power source receptacle 400 is supplied with AC power from the power source 402 (e.g., system power source).

The CCID 330 has built therein a relay 332 and a control pilot circuit 334.

The relay 332 is connected to the power cables 340, through which the power source 402 supplies the charging power to the plug-in hybrid vehicle.

The control pilot circuit 334 includes a microcomputer composed of a CPU, a ROM storing a control program executed by the CPU, a RAM used as a working area, and other components. The following feeding control portion acting as a functional block is implemented when the CPU executes the control program.

The relay 332 is on/off controlled by the feeding control portion. When the relay 332 is turned off, the circuit for supplying power from the power source 402 to the plug-in hybrid vehicle is cut off, while when the relay 332 is turned on, the power source 402 supplies power to the plug-in hybrid vehicle.

Upon connection of the plug 320 to the power source receptacle 400, the control pilot circuit 334 is driven by the power supplied from the power source 402.

The feeding control portion controls a signal generating circuit, which is described later, in order to generate a pilot signal CPLT, which is a control signal transmitted to the ECU 170. The pilot signal CPLT is transmitted to the ECU 170 through a control pilot line L1, which acts as a control line through which the control signal is transmitted to the vehicle.

Upon detecting that the ECU 170 reduces the potential of the pilot signal CPLT to a predetermined value, the feeding control portion controls the signal generating circuit in order to oscillate the pilot signal CPLT at a predetermined period T and a predetermined duty cycle (ratio of the pulse duration to the oscillation period).

Figure 5A:
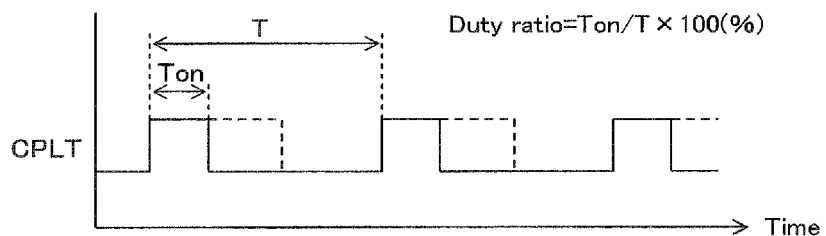
FIG. 5A is a waveform diagram for illustrating a pilot signal generated by a control pilot circuit shown in FIG. 4.

FIG. 5A shows the waveform of the pilot signal CPLT in this regard. Referring to FIG. 5A, the pilot signal CPLT is a pulse signal that oscillates at a predetermined period T of 1 msec., i.e., 1 kHz.

A pulse duration $T_{on}$ of the pilot signal CPLT is set on the basis of a rated current that can be supplied from the power source 402 to the vehicle through the charging cable 300.

Figure 5B:
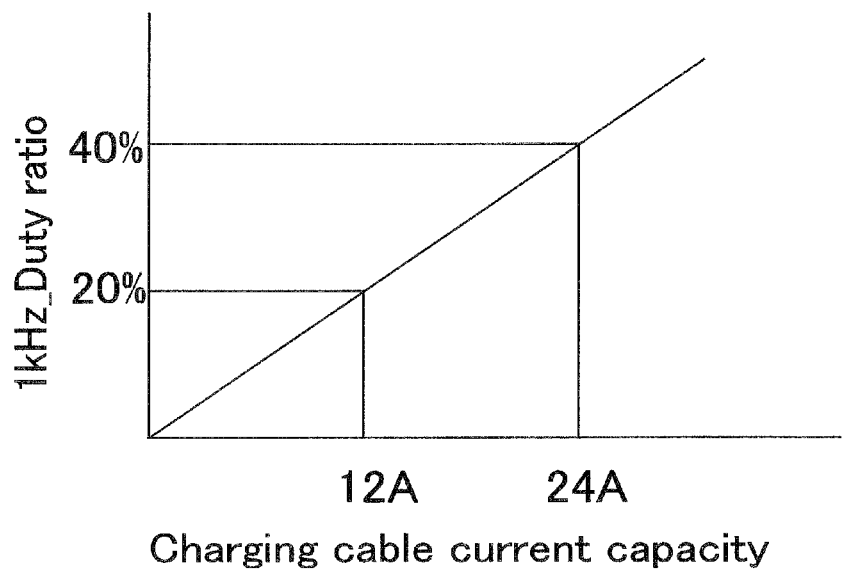
FIG. 5B is a diagram for illustrating a duty cycle relative to the current capacity of a charging cable.

Referring to FIG. 5B, the duty cycle is set on the basis of a capacity of current that can be supplied from the power source 402 to the vehicle through the charging cable 300, i.e., the rated current of the charging cable 300. For example, the duty cycle is set at 20% when the current capacity of the charging cable 300 is 12 A, and at 40% when the current capacity of the charging cable 300 is 24 A.

It should be noted that the rated current is set on a charging cable basis and varies depending on the kind of the charging cable, resulting in a varied duty cycle of the pilot signal CPLT.

The ECU 170 receives the pilot signal CPLT through the control pilot line L1 and detects the duty cycle of the received pilot signal CPLT, thereby recognizing the rated current that can be supplied from the power source 402 to the vehicle through the charging cable 300.

At the side of the vehicle, a voltage sensor 171 and a current sensor 172 are located. The voltage sensor 171 detects a voltage VAC across a pair of power lines between the charging inlet 270 and the LC filter 280 and outputs the detection value to the ECU 170. The current sensor 172 detects a current IAC flowing through the power line between the DFR 260 and the neutral point 112 of the first MG 110 and outputs the detection value to the ECU 170. The current sensor 172 may be provided along the power line between the DFR 260 and the neutral point 122 of the second MG 120.

Figure 6:
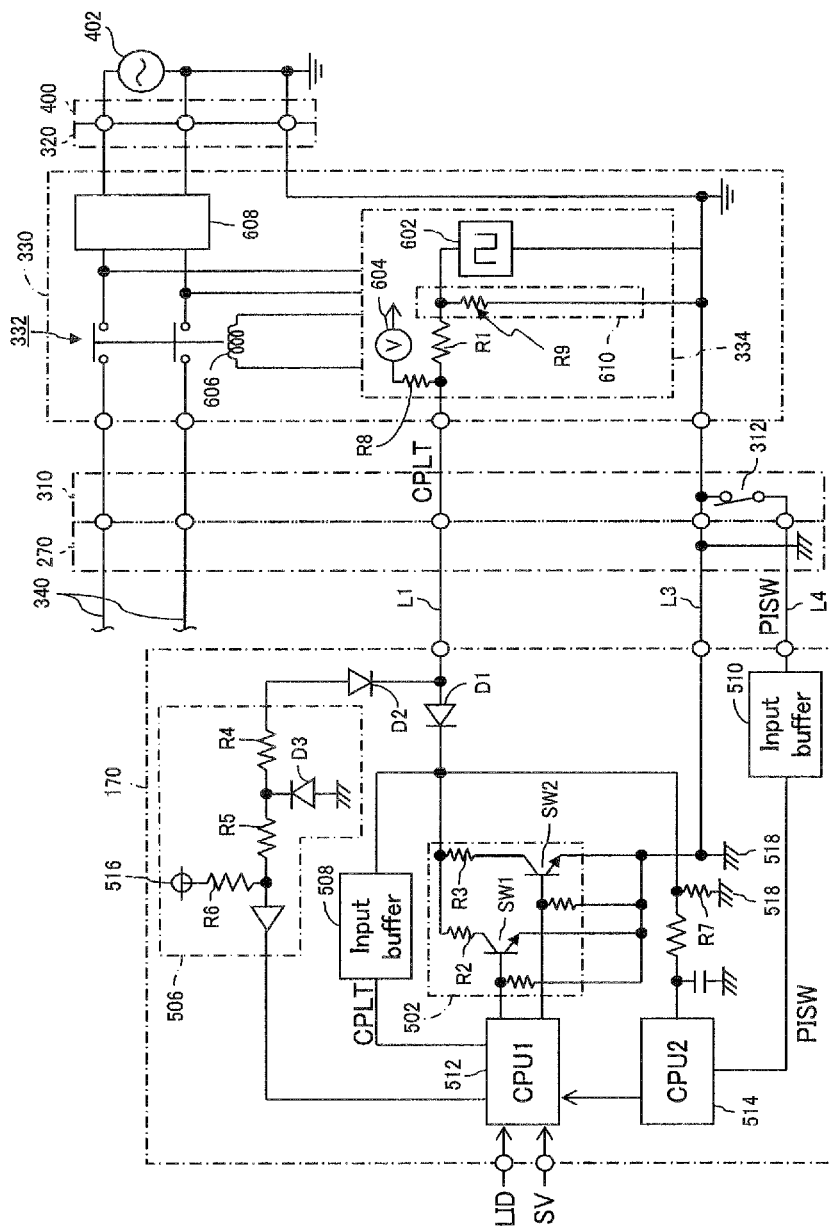
FIG. 6 is a circuit diagram for illustrating in more detail the charging mechanism shown in FIG. 4.

FIG. 6 illustrates in more detail the charging mechanism shown in FIG. 4. Referring to FIG. 6, the CCID 330 has built therein, in addition to the relay 332 and the control pilot circuit 334, an electromagnetic coil 606 for driving the relay 332, a leakage detector 608, and a bypass circuit 610.

The control pilot circuit 334 includes, in addition to the above-described microcomputer, an oscillator 602, which is an example of the signal generating circuit, a resistor element R1, and a voltage sensor 604 for detecting the voltage of the pilot signal CPLT.

The feeding control portion controls the oscillator 602 to output a DC voltage of a predetermined DC potential V1 (e.g., 12V) for the period of the time between connection of the plug 320 to the power source receptacle 400 and decrease in the voltage of the pilot signal CPLT below the predetermined DC potential V1 (e.g., 12V) as detected by the voltage sensor 604.

Upon detecting through the voltage sensor 604 that the voltage of the pilot signal CPLT is below the predetermined DC potential V1, the feeding control portion controls the oscillator 602 to output a pulse signal that oscillates at the above-mentioned predetermined frequency and duty cycle.

The function of the oscillator 602 acting as the signal generating circuit may be implemented by the microcomputer constituting the feeding control portion.

The potential of the pilot signal CPLT detected by the voltage sensor 604 changes when the ECU 170 changes the states of switches SW1 and SW2 of a resistor circuit 502 located in the ECU 170.

Upon detecting through the voltage sensor 604 that the high level potential of the pulse pilot signal CPLT drops to somewhere near a predetermined potential V3 (e.g., 6V), the feeding control portion electrifies the electromagnetic coil 606 to turn the relay 332 into an ON state.

The leakage detector 608, which is located along the power cables 340, monitors the balance between mutually opposite currents flowing through the pair of power cables 340, and detects a disruption of the balance as an occurrence of leakage. Upon detection of a leakage by the leakage detector 608, feeding to the electromagnetic coil 606 is cut off to turn the relay 332 off.

The bypass circuit 610 is a circuit for changing the voltage applied from the ECU 170 through the control pilot line L1 and includes, for example, a pulled-down resistor element R9. The bypass circuit 610 is for the purpose of detecting an abnormal state, such as a break, of the control pilot line L1, through which the pilot signal CPLT is transmitted.

Figure 12:
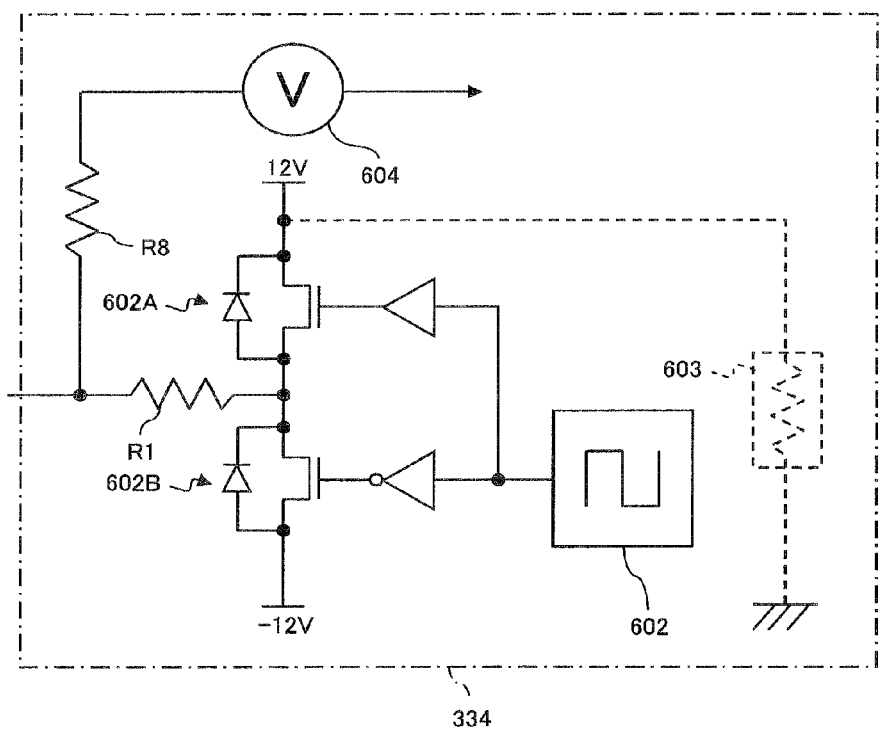
FIG. 12 is a circuit diagram of a signal generating circuit composed of an oscillator and two MOSFETs.

Referring to FIG. 12, when the signal generating circuit is composed of an oscillator 602 and two MOSFETs 602A and 602B that are on/off controlled by a signal output from the oscillator 602, there are cases where the resistor element R9 constituting the bypass circuit is not necessary.

In the case of FIG. 12, one of the MOSFETs is connected to a power source node of a predetermine voltage (e.g., 12V), while the other MOSFET is connected to a power source node of the predetermined voltage of opposite polarity (e.g., −12V).

Switching on/off the MOSFETs by the output of the oscillator 602 results in output of a pulse signal with "12V" and "−12V" alternating with one another to the resistor element R1.

In the case where the power source node is connected to another load 603 as indicated by the broken line in FIG. 12, the load 603 can be used to replace the resistor element R9, which acts as the bypass circuit.

Detection of the abnormal state such as a break by using the bypass circuit 610 is carried out by the ECU 170 at least when the power cables 340 are not connected to the external power source 402. This will be described later.

Referring to FIG. 6, the ECU 170 includes the resistor circuit 502, a voltage generating circuit 506, input buffers 508 and 510, and CPUs (control processing units) 512 and 514. The CPUs 512 and 514 each include a ROM storing a control program and a RAM used as a working area.

The ECU 170 has functional blocks including: a charging control portion for charging the power storage device 150 on the basis of the pilot signal CPLT transmitted through the control pilot line L1; a state detecting portion for detecting an abnormal state of the charging cable on the basis of the signal level of the control pilot line L1; and a level switching portion for changing the signal level of the control line L1 in a stepwise manner.

The processings by these functional blocks are implemented when the CPU 512 and/or the CPU 514 execute the respective control programs.

The state detecting portion detects the abnormal state of the charging cable 300 at the vehicle side on the basis of whether there is a change in the voltage applied to the control pilot line L1 from the vehicle side due to the bypass circuit 610, which is located along the control pilot line L1 on the charging cable 300.

The resistor circuit 502 includes pulled-down resistors R2 and R3 and the switches SW1 and SW2. The pulled-down resistor R2 and the switch SW1 are connected to one another in series between the control pilot line L1, through which the pilot signal CPLT is transmitted, and a vehicle earth 518. The pulled-down resistor R3 and the switch SW2 are connected to one another in series between the control pilot line L1 and the vehicle earth 518, and are connected in parallel to the pulled-down resistor R2 and the switch SW1, which are connected to one another in series.

The resistor circuit 502 is a circuit for changing the potential of the pilot signal CPLT with the switches SW1 and SW2, which are turned on/off depending on a control signal from the CPU 512.

The level switching portion controls the switches SW1 and SW2 in order to change the potential of the pilot signal CPLT. Specifically, the level switching portion carries out off-control of the switch SW1 and on-control of the switch SW2, thereby causing the pulled-down resistor R3 to reduce the potential of the pilot signal CPLT to a predetermined potential V2 (e.g., 9V).

In this state the level switching portion carries out on-control of the switch SW1, thereby causing the pulled-down resistors R2 and R3 to reduce the potential of the pilot signal CPLT to the predetermined potential V3 (e.g., 6V).

The voltage generating circuit 506 includes a power source node 516, pulled-up resistors R4 to R6, and a diode D3.

When the connector 310 of the charging cable 300 is not connected to the charging inlet 270, the voltage generating circuit 506 applies to the control pilot line L1 a divided voltage determined by the voltage (e.g., 12V) at the power source node 516, by the pulled-up resistors R4 to R6, and by a pulled-down resistor R7, which is connected to the vehicle earth 518.

The pilot signal CPLT through the control pilot line L1 is input to the CPU 512 through the input buffer 508. In this embodiment, when the pilot signal CPLT input to the input buffer 508 is equal to or more than a predetermined level, a logic signal of high level H is output to the CPU 512, while when the pilot signal CPLT input to the input buffer 508 is smaller than the predetermined level, a logic signal of low level L is output to the CPU 512.

The cable connection signal PISW through a signal line L4, which is connected to the limit switch 312 of the connector 310, is input to the CPU 514 through the input buffer 510. The signal line L4 is pulled up to the power source voltage through a resistor located in the ECU 170, while the potential of the signal line L4 turns into ground level through the limit switch 312 upon connection of the connector 310 to the charging inlet 270.

That is, the cable connection signal PISW is a signal of low level when the connector 310 is connected to the charging inlet 270 and of high level during disconnection.

The charging control portion will be described in detail below. The CPU 514 receives the cable connection signal PISW through the input buffer 510 and makes a judgment as to the connection between the connector 310 and the charging inlet 270 on the basis of the potential of the cable connection signal PISW The CPU 514 then outputs the judgment result to the CPU 512, which acts as the charging control portion.

The charging control portion receives the pilot signal CPLT through the input buffer 508 and receives from the CPU 514 the judgment result of the connection between the connector 310 and the charging inlet 270.

Upon receipt of the judgment result indicating that the connector 310 is connected to the charging inlet 270, the charging control portion carries out on-control of the switch SW2 through the level switching portion in order to reduce the potential of the pilot signal CPLT to the predetermined potential V2 (e.g., 9V).

Upon turning of the switch SW2 into the ON state by the level switching portion, the charging control portion receives the pulse pilot signal CPLT output from the oscillator 602 in order to detect a rated current that can be supplied from the power source 402 to the plug-in hybrid vehicle.

Upon completion of preparation for charging of the power storage device 150 from the power source 402, the charging control portion, which has now recognized the rated current, carries out on-control of the switch SW1 through the level switching portion in order to reduce the high level potential of the pilot signal CPLT to the predetermined potential V3 (e.g., 6V), and turns the DFR 260 on (see FIG. 4). This causes the AC power from the power source 402 to be fed to the neutral point 112 of the first MG 110 and the neutral point 122 of the second MG 120, thus causing the charging control of the power storage device 150 to be executed.

The state detecting portion will be described below. The state detecting portion detects an abnormal state, such as a break, of the control pilot line L1 on the basis of a new signal level switched by the level switching portion from the former signal level of the pilot signal CPLT, which is through the control pilot line L1.

The case where the plug 320 of the charging cable 300 is not connected to the power source 402 will be first described.

When the connector 310 is not connected to the charging inlet 270, the control pilot line L1 at the ECU 170 side is applied with a voltage divided by the pulled-up resistors R4 to R6 of the voltage generating circuit 506 and by the pulled-down resistor R7, which is connected to the vehicle earth 518, and a high level voltage is output to the CPU 1 through the input buffer 508. The resistors R4 to R7 are set at values that cause a high level voltage to be output from the input buffer 508.

In the case where there is no break on the control pilot line L1 when the connector 310 is connected to the charging inlet 270, the control pilot line L1 is pulled down to ground level by the resistor elements R1 and R9 at the control pilot circuit 334 side.

Whether the connector 310 is connected to the charging inlet 270 is determined by the cable connection signal PISW.

Figure 7:
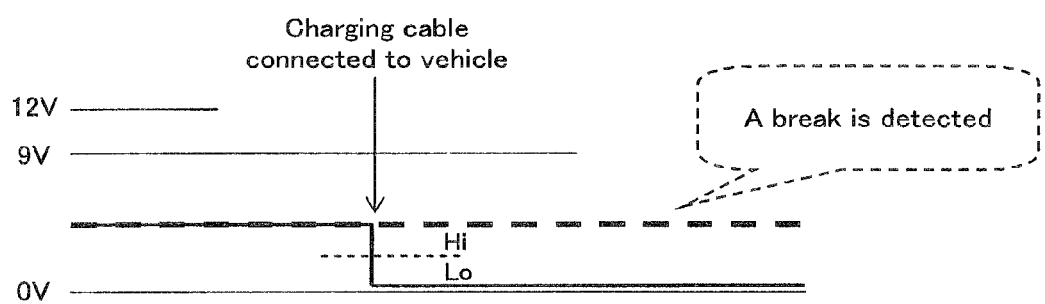
FIG. 7 is a timing chart for describing the pilot signal when an abnormality of the charging cable is detected while a power cable is not connected to the power source.

In the meantime, as indicated by the solid line in FIG. 7, the voltage applied to the control pilot line L1 drops and thus the input buffer 508 outputs a low level voltage, so that the state detecting portion detects the charging cable 300 as normal. The resistor elements R1 and R9 are set at values that cause a low level voltage to be output from the input buffer 508.

In the case where there is a break on the control pilot line L1 of the charging cable 300 when the connector 310 is connected to the charging inlet 270, the resistance of the pulled-down resistors connected to the control pilot line L1 becomes the resistance of the resistor R7.

In the meantime, as indicated by the broken line in FIG. 7, the voltage applied to the control pilot line L1 remains unchanged and thus the input buffer 508 outputs a high level voltage.

Next the case where the plug 320 is connected to the power source 402 will be described.

The control pilot circuit 334 of the charging cable 300 is operating correctly on the power supplied from the power source 402, and thus the above-described feeding control portion controls the pilot signal CPLT through the control pilot line L1 at the predetermined potential V1 (e.g., 12V).

As described above, when the connector 310 is not connected to the charging inlet 270, the control pilot line L1 is applied with a voltage divided by the pulled-up resistors R4 to R6 of the voltage generating circuit 506 and by the pulled-down resistor R7, which is connected to the vehicle earth 518, and the input buffer 508 outputs a high level voltage.

Figure 8:
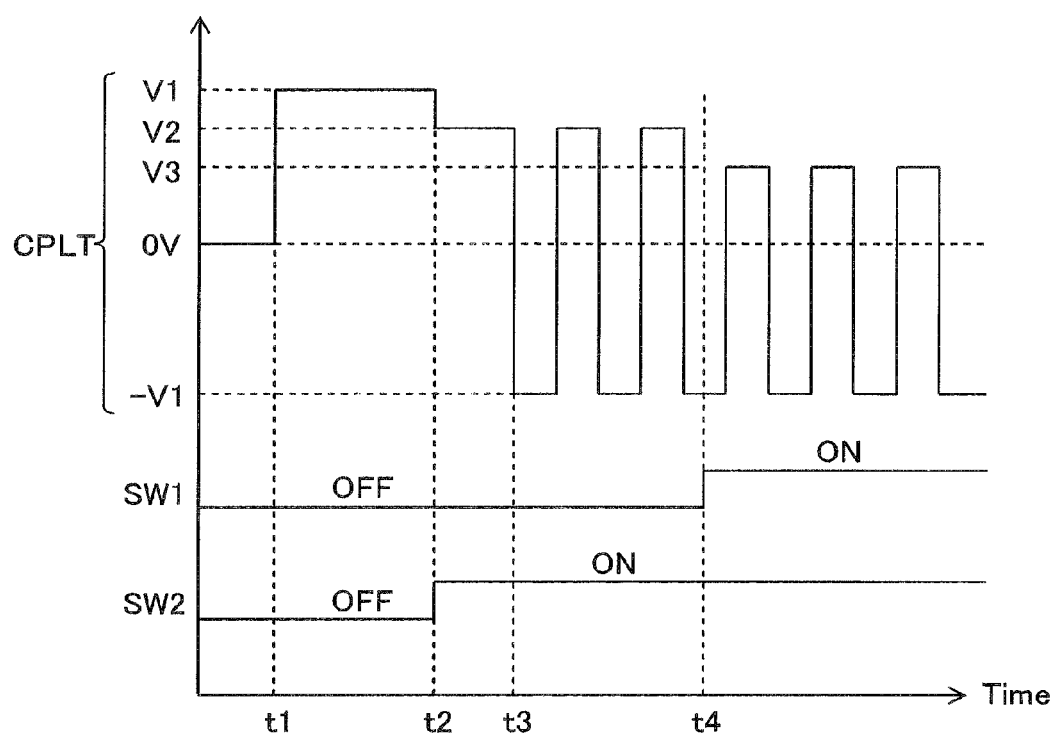
FIG. 8 is a timing chart for describing the pilot signal and switches at the time of start of charging.

Referring to FIG. 8, in the case where there is no break on the control pilot line L1 of the charging cable 300 when the connector 310 is connected to the charging inlet 270, the pilot signal CPLT applied to the control pilot line L1 indicates the predetermined potential V1. (See t1 in FIG. 8.)

Then the charging control portion, upon receipt of the cable connection signal PISW, carries out on-control of SW2 through the level switching portion in order to cause the pulled-down resistor R3 to reduce the potential of the pilot signal CPLT to the predetermined potential V2 (e.g., 9V). (See t2 in FIG. 8.) Here, the input buffer 508 outputs a high level voltage.

Figure 9:
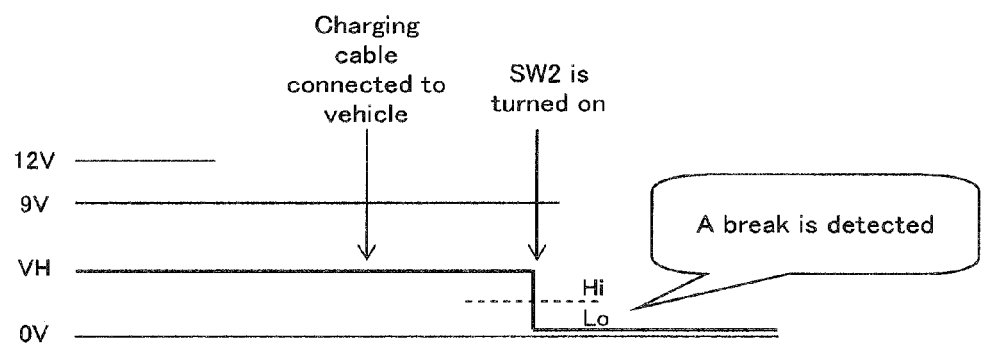
FIG. 9 is a timing chart for describing the pilot signal when an abnormality of the charging cable is detected while a power cable is connected to the power source.

Referring to FIG. 9, in the case where there is a break on the control pilot line L1 of the charging cable 300 when the connector 310 is connected to the charging inlet 270, the pilot signal CPLT is not applied to the control pilot line L1 and thus the voltage at the control pilot line L1 is the voltage divided by the pulled-up resistors R4 to R6 and by the pulled-down resistor R7, which is smaller than the predetermined voltage V1 (12V). However, the output voltage of the input buffer 508 is maintained at the high level voltage VH.

Then the charging control portion, upon receipt of the cable connection signal PISW, carries out on-control of SW2 through the level switching portion. The resistance of the pulled-down resistors connected to the control pilot line L1 becomes the combined resistance of the resistors R7 and R3 at the ECU 170 side, which is smaller than the case of the resistor R7 alone.

This causes a low level voltage to be output from the input buffer 508, and thus the state detecting portion determines the charging cable 300 as abnormal.

While the above description is about the case where the state detecting portion detects an abnormal state, such as a break, of the control pilot line L1 on the basis of a new signal level switched by the level switching portion from the former signal level of the control pilot line L1, the state detecting portion may detect an abnormal state, such as a break, of the control pilot line L1 on the basis of whether a pulse pilot signal CPLT is detected after the level switching portion changes the signal level of the control pilot line L1.

This will be described in detail below. Upon connection of the plug 320 to the power source 402 and connection of the connector 310 to the charging inlet 270, the charging control portion receiving the cable connection signal PISW carries out on-control of SW2 through the level switching portion.

When the control pilot line L1 has no break thereon, the on-control of SW2 causes the signal generating circuit 602 of the charging cable 300 to output a pulse pilot signal CPLT. Since the pilot signal CPLT input through the control pilot line L1 is in a pulse form, the state detecting portion detects the charging cable 300 as normal.

When the control pilot line L1 has a break thereon, no pulse signal is input to the control pilot line L1 even if SW2 is on-controlled, and therefore the state detecting portion detects the charging cable 300 as abnormal.

As has been described hereinbefore, the charging cable 300 according to the present invention includes: the power cable 340 through which the external power source 402 feeds the on-board power storage device 150; the signal generating circuit 602 for generating a control signal (pilot signal CPLT) that corresponds to a capacity of current feedable to the vehicle through the power cable 340; the control line (control pilot line) L1 through which the control signal is transmitted to the vehicle; the feeding control portion for controlling the feeding through the power cable 340 on the basis of the voltage level of the control line L1; and the bypass circuit 610 for changing voltage applied from the vehicle side through the control line L1.

The ECU 170, which is a charging control device according to the present invention, includes: the charging control portion for, when the vehicle is connected with the charging cable 300 enabling feeding from the external power source 402 located outside the vehicle, charging the on-board power storage device 150 on the basis of the control signal (pilot signal CPLT) transmitted through the control line (control pilot line) L1 connected to the vehicle together with the charging cable 300; and the state detecting portion for detecting either the state in which the control line L1 is abnormal or the state in which the control line L1 is normal but the external power source 402 is not connected to the vehicle, on the basis of the signal level of the control line L1 in such a state that connection of the charging cable 300 is detected and the control line L1 is applied with a voltage from the vehicle side.

The plug-in hybrid vehicle to which the charging cable, the charging control device (ECU 170), and the vehicle charging system according to the present invention are applied includes an alarm portion for alarming presence or absence of abnormality of the charging cable 300 detected by the state detecting portion.

The alarm portion is composed of, for example, an LED and positioned somewhere on top of a dashboard that renders the alarm portion visible from outside the vehicle.

The LED lights upon insertion of the plug 320 into the power source receptacle 400 and connection of the charging inlet 270 to the connector 310, that is, upon connection of the vehicle to the power source 402. The LED flashes upon completion of preparation for charging and starting thereof without detection of abnormality of the charging cable 300 by the state detecting portion, and turns off upon completion of the charging. That is, when the LED does not flash after lighting, it can be determined that the charging cable 300 is detected as abnormal.

The lighting control, flashing control, and turning-off control of the LED will not be limited to the above-described configurations, and any other configurations are possible insofar as the connection state of the charging cable 300 to the vehicle, the state of charge, and the abnormal state can be determined. The alarm portion may be something other than LED, examples including a display of liquid crystal or of other material, which would be positioned somewhere that it is visible from outside the vehicle, in which case the display may show presence or absence of an abnormality of the charging cable 300.

FIG. 8 shows a timing chart of the pilot signal CPLT and the switches SW1 and SW2 at the time of start of charging. Referring to FIG. 8, at time t1, the plug 320 of the charging cable 300 is connected to the power source receptacle 400 of the power source 402, and the feeding control portion outputs the pilot signal CPLT upon receipt of power from the power source 402.

At this time, the connector 310 of the charging cable 300 is not yet connected to the charging inlet 270 at the vehicle side, and thus the pilot signal CPLT is a non-oscillating, DC signal of V1 potential (e.g., 12V).

At time t2, the connector 310 is connected to the charging inlet 270, and the charging control portion, which has received the cable connection signal PISW, detects the connection between the connector 310 and the charging inlet 270.

Then the level switching portion turns the switch SW2 on, and the pulled-down resistor R3 of the resistor circuit 502 reduces the potential of the pilot signal CPLT to V2 (e.g., 9V).

At time t3, which is after the potential of the pilot signal CPLT is reduced to V2, the feeding control portion controls the signal generating circuit 602 in order to oscillate the pilot signal CPLT.

Then the charging control portion detects a rated current on the basis of the duty cycle of the pilot signal CPLT, thus completing preparation for the charging control. Then at time t4, the level switching portion carries out on-control of the switch SW1, and the pulled-down resistor R2 of the resistor circuit 502 reduces the potential of the pilot signal CPLT to V3 (e.g., 6V).

Upon reduction of the potential of the pilot signal CPLT to V3, the feeding control portion electrifies the electromagnetic coil 606 through the control pilot circuit 334 in order to turn on the relay 332 of the CCID 330, and then the charging control portion turns the DFR 260 on, thus starting the charging of the power storage device 150 from the power source 402.

Figure 10:
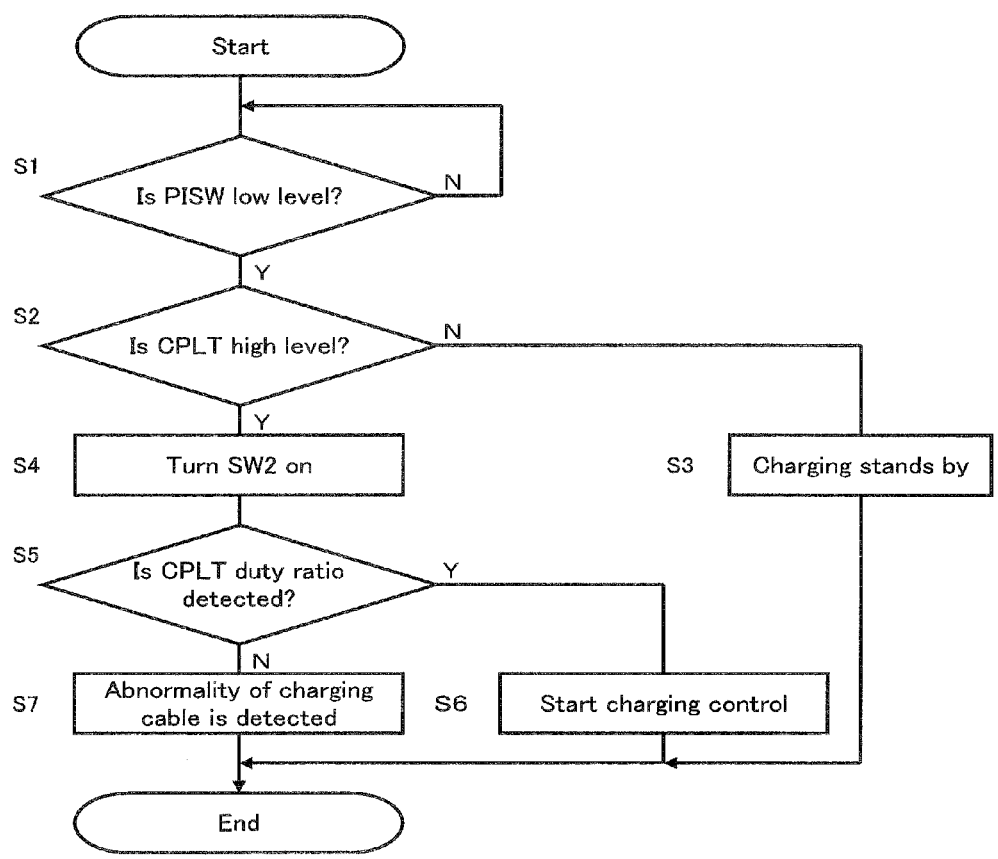
FIG. 10 is a flowchart for describing detection of an abnormality such as a break, of a control pilot line.

The following describes detection of an abnormality, such as a break, of the control pilot line L1 by referring to the flowchart shown in FIG. 10.

When the connector 310 is connected to the charging inlet 270, and a cable connection signal PISW of low level is input to the ECU 170 (S1), then the charging control portion detects the voltage of the control pilot line L1.

When the voltage detected by the charging control portion is at low level (S2), the state detecting portion determines that the control pilot line L1 has no abnormalities such as a break, and that the plug 320 is not connected to the power source receptacle 400, in which case the processing stands by until the plug 320 is connected to the power source receptacle 400 and thus a chargeable state is secured (S3).

When the voltage detected by the charging control portion is at high level (S2), the level switching portion carries out on-control of the switch SW2 (S4).

When, after the switch SW2 is turned on, the pilot signal detected by the charging control portion is in the form of pulse or at high level (S5), then the state detecting portion determines the control pilot line L1 as normal, and thus the charging control portion starts charging the power storage device 150 (S6).

When, after the switch SW2 is turned on, the pilot signal detected by the charging control portion is not in the form of pulse or at low level (S5), then the state detecting portion determines that the control pilot line L1 has a break thereon, that is, determines the charging cable 300 as abnormal (S7).

Next, description will be made of the operation of the first inverter 210 and the second inverter 220 at the time of executing charging of the power storage device 150 from the power source 402.

Figure 11:
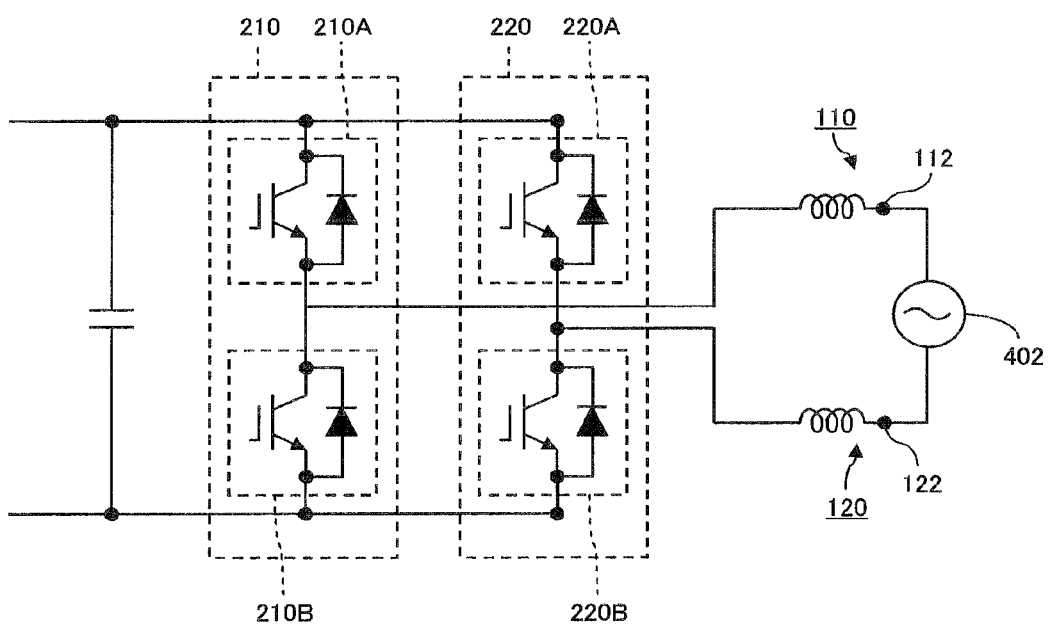
FIG. 11 is a circuit diagram for illustrating a zero-phase equivalent circuit of first and second inverters and first and second MGs shown in FIG. 3.

FIG. 11 shows a zero-phase equivalent circuit of the first and second inverters 210 and 220 and the first and second MGs 110 and 120 shown in FIG. 3.

The first inverter 210 and the second inverter 220 are each composed of a three-phase bridge as shown in FIG. 3, and the six switching elements of each inverter have eight patterns of on/off combination.

Two of the eight switching patterns result in zero correlation voltages, and such voltage state is referred to as a zero-voltage vector The zero-voltage vector provides for the assumption that the three switching elements at the upper arm are in the same switching state (on or off), and that the three switching elements at the lower arm are in the same switching state.

During charging of the power storage device 150 from the power source 402 located outside the vehicle, at least either the first inverter 210 or the second inverter 220 is controlled at zero-voltage vector on the basis of a zero-phase voltage instruction generated by the voltage VAC (detected by the voltage sensor 171 (FIG. 4)) and by the rated current (notified from the charging cable 300 by the pilot signal CPLT).

Thus, in FIG. 11 the three switching elements at the upper arm of the first inverter 210 are collectively indicated as an upper arm 210A, while the three switching elements at the lower arm of the first inverter 210 are collectively indicated as a lower arm 210B.

Likewise, the three switching elements at the upper arm of the second inverter 220 are collectively indicated as an upper arm 220A, while the three switching elements at the lower arm of the second inverter 220 are collectively indicated as a lower arm 220B.

This zero-phase equivalent circuit can be assumed as a single-phase PWM converter that receives input of single-phase AC power that is fed from the power source 402 to the neutral point 112 of the first MG 110 and to the neutral point 122 of the second MG 120.

Thus, the power storage device 150 can be charged with DC power converted from the AC power supplied from the power source 402 by changing the zero-voltage vector of at least one of the first and second inverters 210 and 220 on the basis of a zero-phase voltage instruction, and by carrying out switching control of the first and second inverters 210 and 220 in order to render them operate as arms of the single-phase PVM converter.

As has been described above, the charging cable 300 and the ECU 170 constitute the vehicle charging system according to the present invention.

The charging cable 300 includes: the power cable 340 through which the external power source 402 feeds the on-board power storage device; the signal generating circuit 602 for generating a control signal corresponding to a capacity of current feedable to the vehicle through the power cable 340; the control line L1 through which the control signal is transmitted to the vehicle; the feeding control portion for controlling the feeding from the power cable 340 on the basis of a voltage level of the control line L1; and the bypass circuit 610 for changing voltage applied from the vehicle side through the control line L1.

The ECU 170 includes: the charging control portion for, when the vehicle is connected with the charging cable 300, charging the on-board power storage device 150 on the basis of the control signal transmitted through the control line L1; and the state detecting portion for detecting an abnormal state of the charging cable 300 on the basis of a signal level of the control line L1.

That is, the vehicle charging system includes the above-described ECU 170, i.e., charging control device, for carrying out charging control of the on-board power storage device 150 through the charging cable 300, and the charging control device includes: the charging control portion for charging the power storage device 150 on the basis of the control signal transmitted through the control line L1; and the state detecting portion for detecting an abnormal state of the charging cable 300 on the basis of a signal level of the control line L1.

Another embodiment will be described below. While in the above embodiment description is made of the example in which the ECU 170 acting as the charging control device according to the present invention is composed of the two CPUs 512 and 514, the number of the CPUs constituting the ECU 170 will not be limited to two. The ECU 170 may be implemented by a single CPU that assumes the functions of the CPUs 512 and 514. Alternatively, the ECU 170 may be implemented by more than two CPUs provided on a small function basis.

While in the above embodiment description is made of the series/parallel type hybrid vehicle, in which the power dividing mechanism 130 divides the driving power of the engine 100 and transmits it to the driving wheels 160 and the first MG 110, the present invention is applicable to other types of hybrid vehicles.

For example, the present invention is applicable to: what is called series type hybrid vehicles, which use only the engine 100 to drive the first MG 110 and only the second MG 120 to generate the driving power of the vehicles; hybrid vehicles that retrieve only regenerative power as electrical energy from the kinetic energy generated at the engine 100; and motor-assisted hybrid vehicles, in which the engine provides the main power with the assistance of motors as necessary.

While in the above embodiment description is made of the case of charging the power storage device 150 by feeding AC power from the power source 402 to the neutral points 112 and 122 and by rendering the first and second inverters 210 and 220 and the first and second MGs 110 and 120 operate as a single-phase PWM converter, a dedicated voltage converter and rectifier for charging the power storage device 150 from the power source 402 may be connected in parallel to the power storage device 150.

The present invention is also applicable to hybrid vehicles not provided with the converter 200. The present invention is further applicable to electrical vehicles, which are not provided with the engine 100 and run only on electricity, and to fuel cell vehicles provided with fuel cells as power source in addition to the power storage devices.

The above embodiments have been described by way of example and will not limit the present invention. Accordingly, the scope of the present invention should be determined not by the embodiments illustrated, but by the appended claims including any modifications made within the spirit and scope of the appended claims and their equivalents.

What is claimed is:

1. A charging cable comprising:
   a power cable through which an external power source feeds a power storage device located in a vehicle;
   a signal generating circuit configured to generate a control signal corresponding to a capacity of current feedable to the vehicle through the power cable;
   a control line through which the control signal is transmitted from an output terminal of the signal generating circuit to the vehicle;
   a feeding control portion configured to control a start or an end of the feeding to the vehicle through the power cable based on a voltage level of the control line that is controlled by the vehicle side; and
   a bypass circuit located between the output terminal of the signal generating circuit and a ground configured to change voltage applied from the vehicle side to the control line, and configured to detect an abnormal state of the control line at the charging cable side based on a voltage level of the control line at the vehicle side.

2. A vehicle charging system comprising:
   a charging cable; and
   a charging control device configured to carry out charging control of a power storage device located in a vehicle through the charging cable, wherein:
   the charging cable includes:
   a power cable through which an external power source feeds the power storage device located in the vehicle;
   a signal generating circuit configured to generate a control signal corresponding to a capacity of current feedable to the vehicle through the power cable;
   a control line through which the control signal is transmitted from an output terminal of the signal generating circuit to the vehicle;
   a feeding control portion configured to control a start or an end of the feeding to the vehicle through the power cable based on a voltage level of the control line that is controlled by the vehicle side; and
   a bypass circuit located between the output terminal of the signal generating circuit and a ground configured to change voltage applied from the vehicle side to the control line, and configured to detect an abnormal state of the control line at the charging cable side based on a voltage level of the control line at the vehicle side; and
   the charging control device includes:
   a charging control portion configured to charge the power storage device on the basis of the capacity of current indicated by the control signal transmitted through the control line; and
   a state detecting portion configured to detect whether the control line at the charging cable side is in the abnormal state or not based on whether the voltage applied to the control line is changed by the bypass circuit.

3. The vehicle charging system according to claim 2, wherein:
   the charging control device includes a level switching portion configured to change the voltage level of the control line in a stepwise manner; and
   the state detecting portion detects a break of the control line at the charging cable side based on a new voltage level of the control line switched from the former voltage level by the level switching portion.

4. The vehicle charging system according to claim 2, wherein:
   the charging control device includes a level switching portion configured to change the voltage level of the control line in a stepwise manner; and
   the state detecting portion detects a break of the control line at the charging cable side based on a detection state of the control signal after the level switching portion changes the voltage level of the control line.

5. A charging control device comprising:
   a charging control portion configured to charge the power storage device when the vehicle is connected with the charging cable according to claim 1, the charging being based on the capacity of current indicated by the control signal transmitted through the control line, and
   a state detecting portion configured to detect, when connection of the charging cable to the vehicle is detected and the voltage applied to the control line is changed by the bypass circuit, a state in which the control line is normal but the power cable is not connected to the external power source.

* * * * *

UNITED STATES PATENT AND TRADEMARK OFFICE
CERTIFICATE OF CORRECTION

| | | |
|---|---|---|
| PATENT NO. | : 8,198,855 B2 | |
| APPLICATION NO. | : 12/498094 | |
| DATED | : June 12, 2012 | |
| INVENTOR(S) | : Satoshi Fukui et al. | |

It is certified that error appears in the above-identified patent and that said Letters Patent is hereby corrected as shown below:

Line 36, column 4 should be corrected to read:

--SMR (System Main Relay) 250--

Signed and Sealed this
Twenty-eighth Day of August, 2012

David J. Kappos
*Director of the United States Patent and Trademark Office*